United States Patent [19]
Gillet

[11] 4,362,960
[45] Dec. 7, 1982

[54] SPACER ASSEMBLY FOR A STATOR VENTING DUCT OF AN ELECTRIC POWER MACHINE

[75] Inventor: Roger Gillet, Belfort, France

[73] Assignee: Societe Anonyme Dite: Alsthom-Atlantique, Paris, France

[21] Appl. No.: 259,274

[22] Filed: Apr. 30, 1981

[30] Foreign Application Priority Data

Apr. 30, 1980 [FR] France ................ 80 09763

[51] Int. Cl.³ .................................... H02K 1/32
[52] U.S. Cl. ........................... 310/65; 310/57
[58] Field of Search ............ 310/52, 55, 57, 58, 310/43, 59, 60 R, 60 A, 64, 65, 254, 45, 259, 216, 217, 61; 336/60

[56] References Cited

U.S. PATENT DOCUMENTS

| | | | |
|---|---|---|---|
| 422,863 | 3/1890 | Washburn | 310/65 |
| 1,282,684 | 10/1918 | George | 310/65 |
| 1,320,781 | 11/1919 | Mossay | 310/57 |
| 1,476,986 | 12/1923 | Kusterman | 310/65 |
| 2,099,575 | 11/1937 | Savage | 310/57 |
| 3,439,202 | 4/1969 | Wanake | 310/52 |

FOREIGN PATENT DOCUMENTS

| | | | |
|---|---|---|---|
| 669485 | 10/1964 | Belgium | 310/52 |
| 103236 | 10/1897 | Fed. Rep. of Germany | 310/91 |
| 539161 | 11/1953 | Fed. Rep. of Germany | 310/61 |
| 162251 | 6/1933 | Switzerland | 310/58 |
| 5234 | of 1914 | United Kingdom | 310/65 |
| 1029507 | 5/1966 | United Kingdom | 310/61 |
| 127738 | 6/1959 | U.S.S.R. | 310/60 A |

Primary Examiner—R. Skudy
Attorney, Agent, or Firm—Sughrue, Mion, Zinn, Macpeak & Seas

[57] ABSTRACT

A spacer assembly for a stator venting duct of an electric power machine. This spacer assembly is constituted by spacer members in the form of flexible insulating rods (4) and a magnetic metal support sheet disposed in a substantially radial configuration between two magnetic metal sheets (2, 6) of the stack which constitutes the stator magnetic circuit of an alternator. Stops (16) are formed on the metal support sheet (2) cutting out tongues and bending them to engage both sides of the rod after elastically bending the rod.

4 Claims, 2 Drawing Figures

SPACER ASSEMBLY FOR A STATOR VENTING DUCT OF AN ELECTRIC POWER MACHINE

The invention relates to a spacer assembly for a stator venting duct in an electric power machine.

BACKGRROUND OF THE INVENTION

The stator magnetic circuit of a power alternator is often constituted by a set of magnetic laminations stacked along the axis of the rotor and clamped together by means of tie rods parallel to this axis.

This stack is subjected to losses, i.e. it gives off heat due to the effect of variable magnetic induction. The magnetic circuit is cooled by venting ducts, i.e. gaps provided between the laminations of the stack, in which gaps a cooling gas circulates radially. These gaps are maintained by venting duct spacer members in the form of rods which extend radially and which are clamped between two laminations of the stack. The rods must be fixed on a metal support sheet so as to allow the stack to be assembled without danger of the rods moving.

In accordance with one known solution, the venting duct spacer members are made of metal and are resistance welded on to a soft steel support sheet 0.6 mm thick. They are interposed in the stator stack, the magnetic laminations used for the magnetic circuit not being suitable for welding. Once the spacer members are welded, the welds are fettled (cleaned) and the assembly is coated with a protective layer of paint. The disadvantage of this solution is that the metal support sheet and the metal spacer members (which, in general, are non-magnetic) are the seat of appreciable losses, thereby reducing the efficiency of the machine.

Preferred embodiments of the present invention produce a stator venting duct spacer assembly for an electric power machine in which simple means are provided to greatly reduce the losses.

SUMMARY OF THE INVENTION

The present invention provides a spacer assembly for a stator venting duct of an electric power machine whose stator magnetic circuit is constituted by an axial stack of magnetic laminations, said stack being held clamped and being cooled by circulation of a fluid in venting ducts each formed by a gap which is maintained by the spacer assembly between two laminations of the stack. The spacer assembly includes:

a metal support sheet which is suitable for incorporating in the axial stack of magnetic laminations to constitute one side of the venting duct therein, said metal support sheet having an inner surface on the venting duct side and an outer surface on the opposite side, said metal support sheet being a metal sheet of the same magnetic quality and same thickness as those of the magnetic circuit and having fixing means which project into the venting duct from the said inner surface; and distance pieces or spacer members fixed on said inner surface of said metal support sheet by means of said fixing means so as to maintain the gap which forms a venting duct between said inner surface and the adjacent magnetic lamination on the other side of the venting duct.

The distance pieces are elastically flexible rods made of an insulating material, said fixing means constituting at least three side stops, said side stops being disposed alternately on either side of the rod and out of line therewith so as to keep the rod elastically bent and thus to obtain permanent lateral pressure of the rod on each of the stops.

The invention can provide the following advantages.

Since it is no longer necessary to weld the spacer members, the metal support sheets used can be identical to those of the magnetic circuit and therefore losses therein are low. (Further, only on type of metal sheet is necessary).

The side stops are formed on the protected and insulated metal sheet, this dispensing with workshop units for fettling and painting metal support sheets.

Since the spacer members are made of insulating materials, they are not the seat of loss. With the improved magnetic quality of the metal support sheets, this leads to improved energy efficiency of the machine.

BRIEF DESCRIPTION OF THE DRAWINGS

With reference to the accompanying figures, an implementation of the invention is described by way of a non-limiting example. When the same component is illustrated in several figures, it is designated by the same reference therein.

DESCRIPTION OF PREFERRED EMBODIMENT

Figure 1:
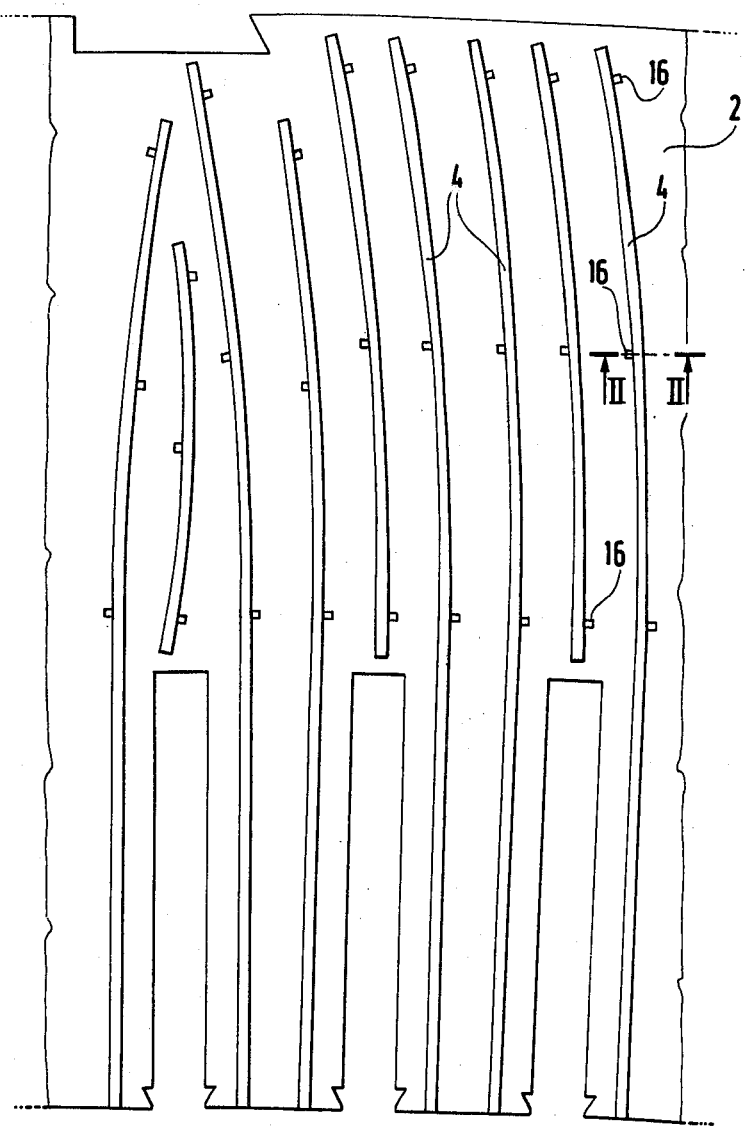
FIG. 1 is a front view of a spacer assembly in accordance with the invention, the plane of the figure being perpendicular to the axis of the alternator.
Figure 2:
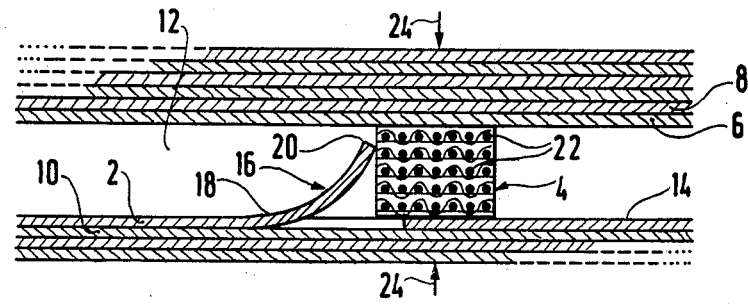
FIG. 2 is a cross-section of the spacer assembly on an enlarged scale taken about line II—II, FIG. 1, the cross-section being parallel to the axis of the alternator.

A spacer member is conventionally constituted by rods 4 of rectangular cross-section and clamped between two laminations 2 and 6 constituting the magnetic circuit of the stator of an alternator. The rods are in the shape of curved sectors and are disposed in a substantially radial configuration so as to maintain gaps (venting ducts) 12 between given laminations 6, 8, 10, etc. A cooling gas is thus enabled to circulate radially in said gaps.

Each rod is made of insulating material extending lengthwise in the plane of the gap 12 and having thickness coextensive with the thickness of the gap and is fixed on either one of the adjacent two magnetic laminations 2, 6 forming support sheets by suitable fixing means so as to allow the stack to be assembled without the rods moving.

A rod is constituted by layers of glass fabric and (epoxy) resin, the layers of fabric 22 being disposed in planes perpendicular to the stack compression direction 24 (the "longitudinal" direction, i.e. the direction of the axis of the alternator). Such a constitution enables it to withstand the high compression to which it is must subject and because of which conventional rods are made of metal.

The fixing means are constituted by side stops 16 provided by local deformation of the support sheet 2.

These stops are formed by cutting and bending the support sheet 2 to form tongues which are, for example, rectangularly bent and whose bases 18 remain integral with and connected to the sheets and whose tongue ends or heads 20 (sides or apexes on the furthest sides from the bases) project above the sheets to constitute abutments for the sides of rods 4.

The rods 4 are flexible, i.e. easily deformable by elastic bending and there are at least three stops which are disposed alternately on either side of a rod and out of line therewith so as to bend the rod and thus, after easy installing, to make it exert a permanent sideways pressing force on each of the tongue ends 20, the resulting friction preventing the rod from moving away.

I claim:

1. A spacer assembly for a stator venting duct of an electric power machine having a stator magnetic circuit constituted by an axial stack of magnetic laminations, said stack being held clamped and being cooled by circulation of a fluid in venting ducts each formed by a gap which is maintained by spacer members between two laminations of the stack, said spacer assembly including:

a metal support sheet incorporated in the axial stack of magnetic laminations to constitute one side of the venting duct therein, said metal support sheet having an inner surface on the venting duct side and an outer surface on the opposite side, said metal support sheet being of the same magnetic quality and same thickness as the laminations of the magnetic circuit and having fixing means which project into the venting duct from said inner surface; and spacer members fixed on said inner surface of said metal support sheet by means of said fixing means so as to maintain the gap which forms a venting duct between said surface and the adjacent magnetic lamination on the other side of the venting duct; and wherein said spacer members comprise flexible rods made of an insulating material extending lengthwise in the plane of the gap, having a thickness coextensive with the thickness of said gap, and wherein said fixing means constitute a succession of at least three side stops for each of said flexible rods, said side stops being disposed alternately on either side of each rod and out of line so as to keep each rod elastically bent in the plane of the gap providing permanent lateral pressure of the rod by deformation on each of the stops.

2. A spacer according to claim 1, wherein said stops are constituted by deformations of said metal support sheet.

3. A spacer member according to claim 2, wherein said stops are constituted by tongues cut in the metal support sheet, the tongues including a base constituted by a side remaining attached to the metal support sheet and a head on the side furthest from said base, the tongue being curved so that its head projects away from said inner surface.

4. A spacer member according to claim 1, wherein said rod is constituted by layers of glass fabric in a polymerized resin, layers of glass fabric being disposed parallel to said metal support sheet.

* * * * *